United States Patent
Machida et al.

[15] 3,636,431
[45] Jan. 18, 1972

[54] BYPASS CONTROL SYSTEM FOR HIGH-VOLTAGE DC CONVERTER USING SEMICONDUCTOR CONTROL RECTIFIERS

[72] Inventors: Takehiko Machida; Yukio Yoshida, both of Tokyo; Noriyoshi Fujii; Kenjiro Yokoyama, both of Hitachi-shi, all of Japan

[73] Assignees: Hitachi Ltd.; Zaidan Hojin Denryo Chuo Kenkyusho, Tokyo, Japan

[22] Filed: Dec. 24, 1969

[21] Appl. No.: 887,934

[30]        Foreign Application Priority Data

Dec. 27, 1968   Japan.................................43/95466
   Dec. 27, 1968   Japan.................................43/95468

[52] U.S. Cl.................................................321/11, 321/13
[51] Int. Cl.........................................H02m 1/08, H02m 1/18
[58] Field of Search.....................................321/11–14, 27; 315/119, 123, 252

[56]         References Cited

UNITED STATES PATENTS 2,532,108   11/1950   Lamm....................................321/11
2,534,036   12/1950   Lamm....................................321/11
3,405,344   10/1968   Boksjo et al. .........................321/27 X

OTHER PUBLICATIONS

Adamson and Hingorani, High–Voltage Direct Current Transmission, Garraway Ltd., London 1960, pp. 89, 90
IEE, High– Voltage DC Transmission, Conference Publication No. 22, Part 1 contributions, " Sequential Operation of HVDC Convertors Without By–Pass Valves" pp. 207– 210

Primary Examiner—William H. Beha, Jr.
Attorney—Craig, Antonelli & Hill

[57]             ABSTRACT

A bypass control system wherein the rectifiers or inverters in high-voltage DC power transmission, DC interconnecting frequency changer and so forth are constituted by semiconductor controlled rectifiers, and the design is made such that the semiconductor controlled rectifiers constituting two arms in series of the converter can be fired simultaneously if necessary, thereby eliminating bypass valves required for removing the conventional converter. The removal of the converter can be achieved in a short time in case that one arm has brought about commutation failure and the other arm connected in series therewith is fired.

9 Claims, 10 Drawing Figures

INVENTORS
TAKEHIKO MACHIDA, YUKIO YOSHIDA,
NORIYOSHI FUJII and KENJIRO YOKOYAMA

BY
Craig, Antonelli, Stewart & Hill
ATTORNEYS

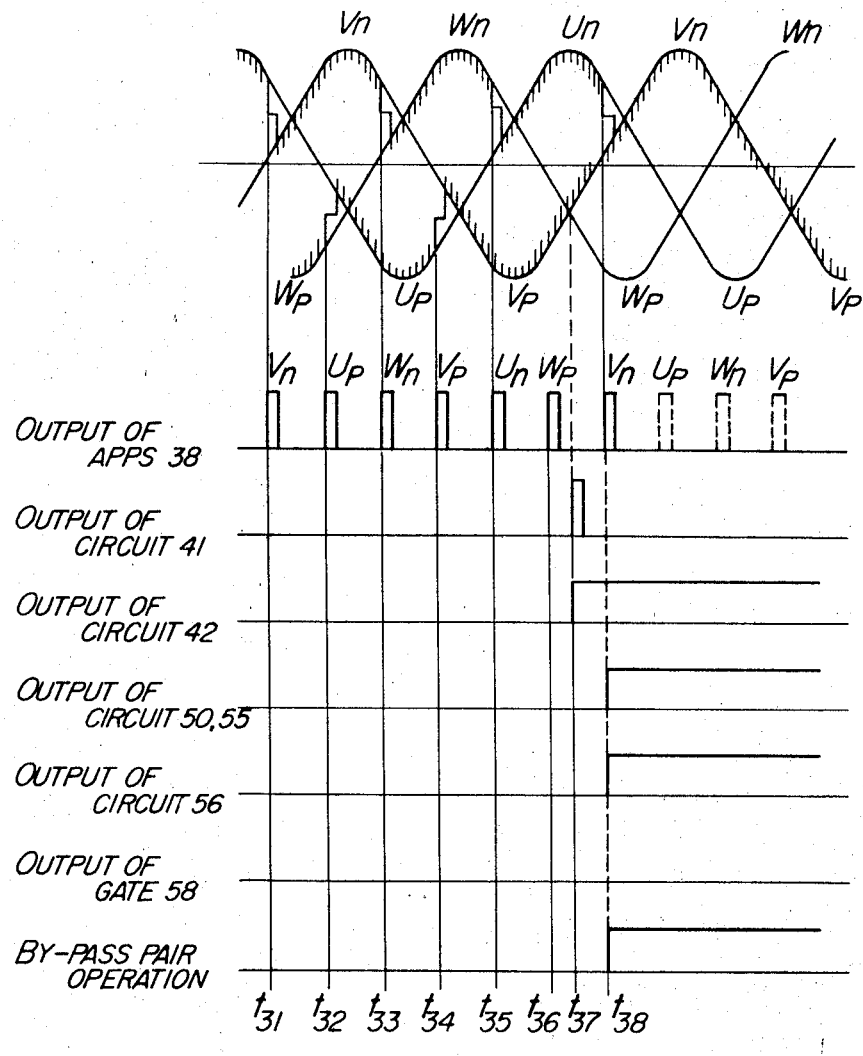

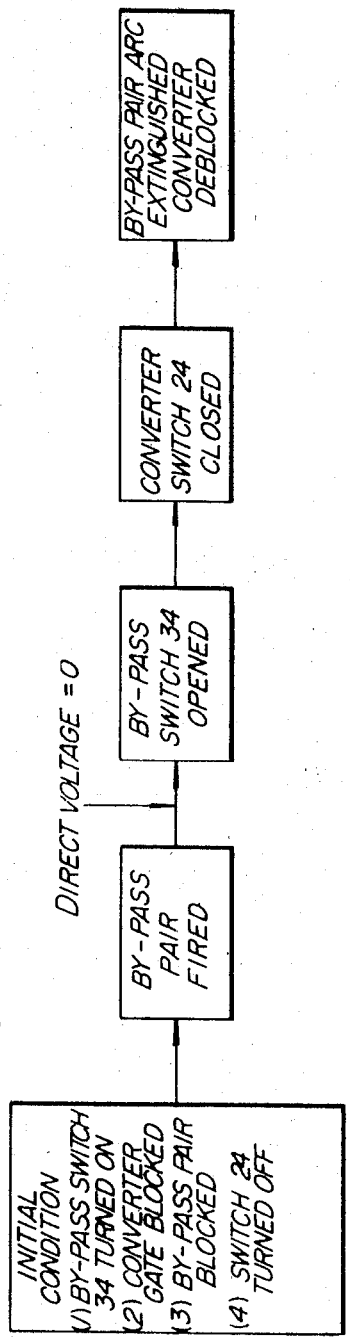
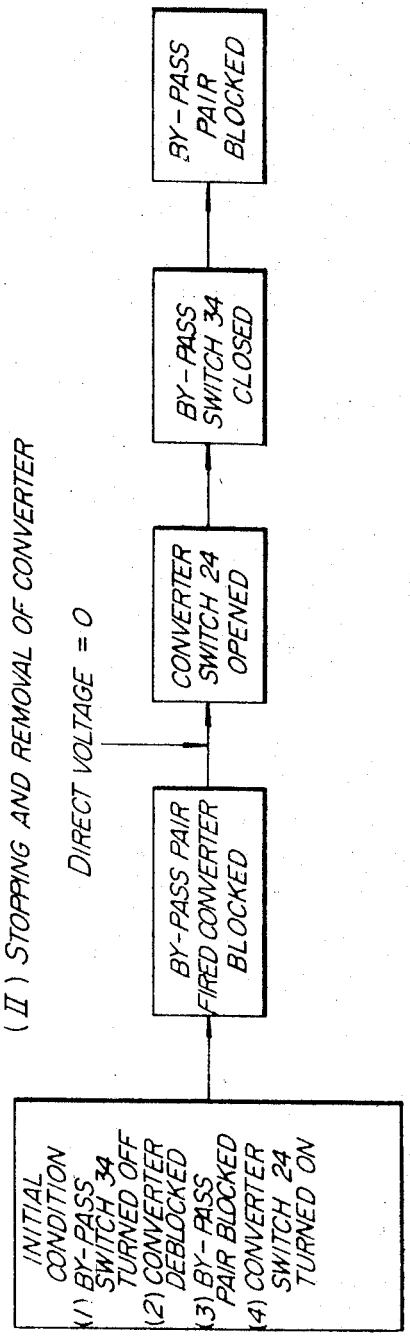

BYPASS CONTROL SYSTEM FOR HIGH-VOLTAGE DC CONVERTER USING SEMICONDUCTOR CONTROL RECTIFIERS

This invention relates to a bypass control system for achieving removal of a converter for high-voltage DC transmission, DC interconnecting frequency changer and so forth.

In the conventional DC power transmission system, for example, it is well known that the converter is constituted by the use of mercury arc rectifiers, and this has practically been achieved. Recently, however, attempts have been made to construct such a converter by using semiconductor controlled rectifiers (referred to as thyristors hereinafter), as a result of the development of such improved thyristors. As is well known in the art, mercury arc rectifiers are disadvantageous in that they not only necessitate various types of an a number of auxiliary devices but also essentially fail to avoid backfire. This inevitably leads to the complication of the control and protection system and are incapability of continuous stable running. In contrast, thyristors are essentially free from such backfire, and therefore it is possible to simplify the control and protection system and effect continuous stable running by the use of such thyristors.

Generally, a plurality of rectifiers or inverters are connected in series with each other to construct the converter, whether the latter uses mercury arc rectifiers or thyristors. Hence, it is essential that the design be made so that the function of DC power transmission is not interrupted due to such trouble as commutation failure for example which occurs with any of the rectifiers or inverters. To this end, a bypass circuit is provided for each rectifier or inverter so that upon the occurrence of trouble in any of the rectifiers or inverters, the current is transferred to the bypass circuit associated therewith thereby to remove such a rectifier or inverter. In order to avoid the occurrence of an arc in the bypass circuit, a bypass valve is provided for the purpose of previously bridging the bypass circuit, so that the current may be transferred to the bypass circuit through the valve. However, such an arrangement is economically disadvantageous because such bypass valves are expensive.

The present invention has been made in view of the fact that thyristors are essentially free from backfire in the case where they are used to construct a converter.

Accordingly, it is a primary object of the present invention to provide a control system wherein it is possible to omit bypass valves for transferring current to a bypass circuit.

Another object of the present invention is to provide a control system wherein circuits utilizable in place of bypass valves can be established by making use of an arm upon commutation failure.

Still another object of the present invention is to provide a control system wherein unnecessary trouble can be prevented which tends to be caused when a current is transferred from a converter to a bypass circuit.

This invention is characterized in that the use of bypass valves can be eliminated by simultaneously firing two arms in series constituted by rectifiers or inverters, and that one of these arms may be regarded as one with commutation failure, if desired, so that a current can be transferred to a bypass circuit in a short time. A further feature of the present invention is such that the transfer of the current transferred from the two arms in series to the bypass circuit is effected after the AC side of the rectifiers or inverters is opened, thereby preventing DC short-circuiting due to error arc-through which may have occurred in the other arms.

Other objects, features and advantages of the present invention will become apparent from the following description taken in conjunction with the accompanying drawings, in which:

FIGS. 4, 5 and 6 are waveforms useful for explaining the operation of the embodiment shown in FIG. 3, respectively;

FIG. 7 is a control flow chart useful for explaining the opening-closing control for the bypass switch according to the present invention;

Figure 1:
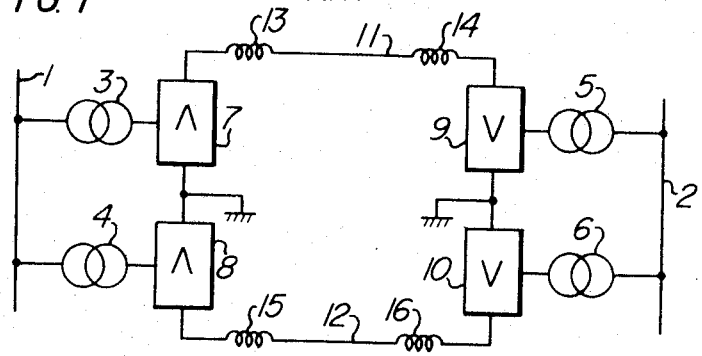
FIG. 1 is a block diagram showing an example of the arrangement of a common DC power transmission facility.

Referring to FIG. 1, numerals 1 and 2 represent AC buses, respectively, 3, 4, 5 and 6 transformers, respectively, 7, 8, 9 and 10 converters, respectively, 11 and 12 DC power transmission lines, respectively, and 13, 14, 15 and 16 DC reactors, respectively. For example, the converters 7 and 8 are made to operate as rectifiers, whereas the converters 9 and 10 are made to operate as inverters, so that power may be transmitted from the bus 1 to the bus 2. At times, however, there is such a reverse occasion that the converters 9 and 10 are made to serve as rectifiers and the converters 7 and 8 as inverters so that power may be transmitted from the bus 2 to the bus 1.

Figure 2:
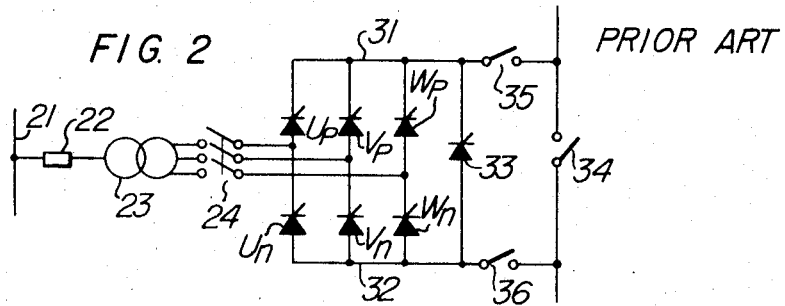
FIG. 2 is a connection diagram showing an example of the unit arrangement of a converter.

Referring now to FIG. 2, brief description will be made of the conventional control for effecting the starting or stopping of such a DC power transmission facility as described above or effecting partial stopping of the converters without interrupting the entire operation of the facility.

FIG. 2 is a view useful for explaining the converters 7, 8 or 9, 10 or one unit constituting such converters, wherein numeral 21 indicates an AC bus, 22 a circuit breaker, 23 a transformer, 24 a switch for converter, $U_p$, $V_p$, $W_p$, $U_n$, $V_n$ and $W_n$ valves connected in six-phase graetz connection for the respective arms of the transformer and each of which is constituted by a mercury arc rectifier; 31 and 32 DC buses; 33 a bypass valve bridging the buses 31 and 32, 34 also a bypass valve; and 35 and 36 separating switches. The AC bus 21 corresponds to the bus 1 or 2 in FIG. 1, and the transformer 23 to the transformer 3 or unit associated therewith, for example.

In the case where the bypass valve 33 such as shown in the drawing is provided in the converter, then the converter can be separated from the system without interrupting the entire operation of the DC power transmission facility by gate-blocking the respective valves $U_p$, $V_p$, ....., $W_n$, firing the bypass valve 33 to cause DC current to flow through the bypass valve 33, subsequently turning on the bypass switch 34 and further opening the separating switches 35 and 36. Reversely, in an attempt to render the converter operative, the separating switches 35 and 36 are first turned on to fire the bypass valve 33, and the bypass switch 34 is opened. Subsequently, the respective valves $U_p$, $V_p$, ....., $W_n$ are gate-controlled as converters, and the bypass valve 33 is arc-extinguished. Thus the converter can be made to take part in the operation.

In the case where each arm of the converter is constituted by a mercury arc rectifier, since it is often the case that backfire occurs even during normal operation, a bypass valve is essentially required to extinguish such backfire in order to recover normal operation. Therefore, the foregoing control system has conveniently been utilized to facilitate the controlling operation.

However, there is essentially no possibility that backfire occurs with a thyristor, and therefore in the case where use is made of a thyristor, it is essentially not needed to provide a bypass valve for the purpose of countering against backfire. In the case where each arm of the converter is constituted by a thyristor, therefore, it is desirable that the bypass valve be eliminated. The present invention is intended to achieve this.

Figure 3:
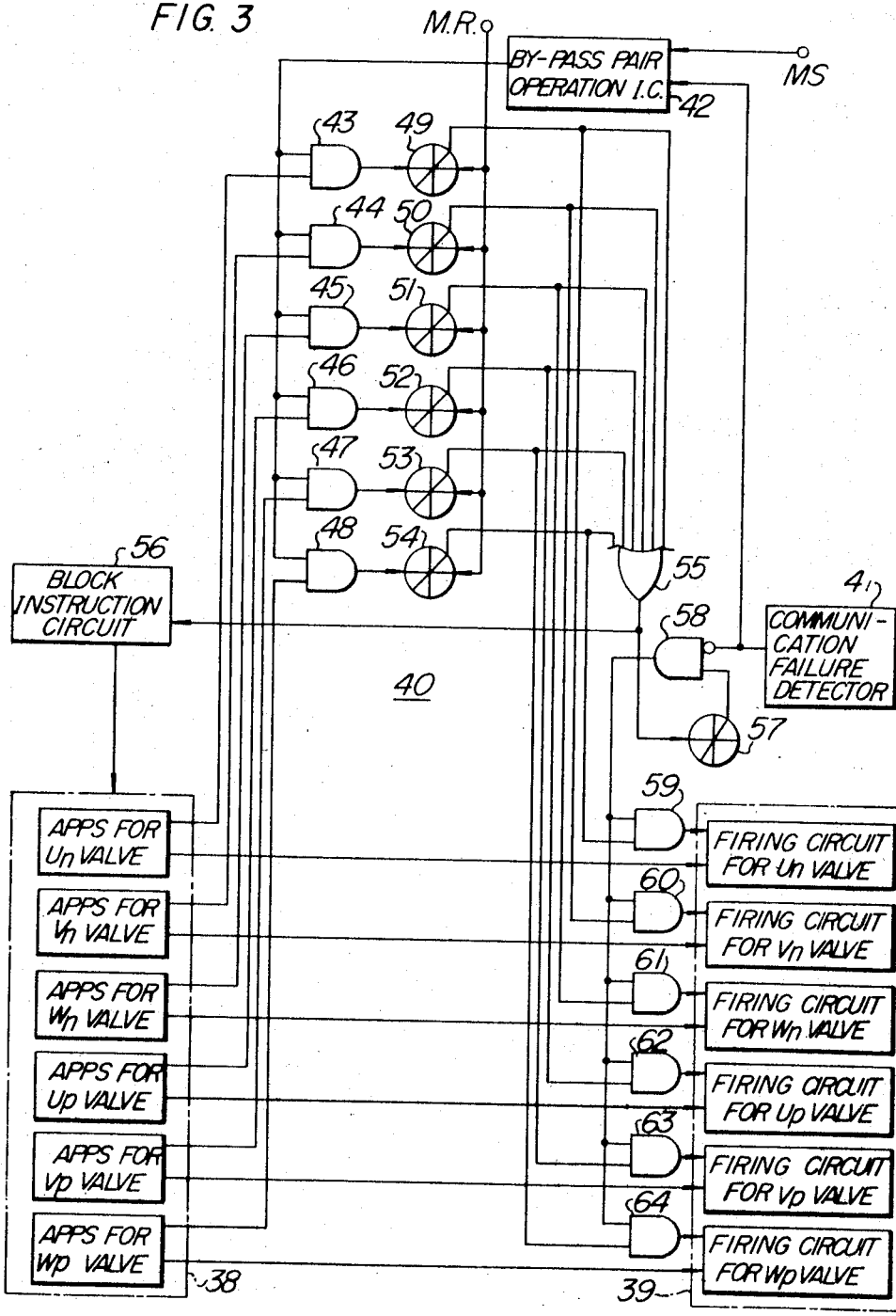
FIG. 3 is a block diagram showing the main portion of an embodiment of the present invention.

As will be seen also from the foregoing, the function of the bypass valve 33 is only to bypass a current flowing through each arm of the converter. Therefore, if the valves say $U_p$ and $U_n$ constituting two arms in series of the converter can be fired at the same time, and this causes no trouble with respect to the equipment, then it is possible to replace the bypass valve 33 with the series circuit (referred to as a bypass pair), so that the bypass valve 33 can be omitted. However, in the case where the valves are constituted by mercury arc rectifiers, there is the possibility that even when the valves U$p$ and U$n$ are fired at the same time, the remaining valve U$p$, V$n$, W$p$ and W$n$ are backfired, thus resulting in the secondary side of the transformer 23 being short-circuited AC-wise. For this reason, the foregoing cannot be achieved. On the other hand, in the case where thyristors are used, there occurs no phenomenon of backfire, and therefore the foregoing can be achieved by specially designing the control. Description will now be made of the bypass control system according to the present invention. FIG. 3 is a block diagram showing an example of the main portion of the present invention in which for each valve, there are provided an automatic pulse phase shifter circuit APPS for imparting thereto a firing pulse of which the phase depends upon whether the output voltage (current) is available from the rectifier or inverter, and a firing circuit which is constituted mainly by a pulse transformer for firing the valves by the use of the output of the pulse phase shifter circuit, as will be readily apparent to those skilled in the art. In FIG. 3, the APPS and firing circuits are indicated in block form at 38 and 39, respectively. In accordance with the present invention, there is provided an additional circuit 40 in addition to the APPS and firing circuits. This additional circuit 40 will be described below. The numeral 41 denotes a commutation failure detecting circuit adapted to provide an output by detecting a commutation failure of the converter in accordance with the relationship between the magnitudes of the phase voltage and current. Numeral 42 indicates a bypass pair operation instructing circuit which is adapted to provide an output in the presence of either the output of the aforementioned commutation failure detecting circuit 41 or bypass pair signal which is manually externally imparted to a terminal MS. Numerals 43, 44, ..... and 48 represent AND gates respectively which are adapted to provide an output when the bypass pair operation instruction circuit 42 provides an output and the APPS associated with each of the valves U$n$, V$n$, ....., W$p$ corresponding to the gates provides an output. Numerals 49, 55, ..... and 54 indicate memory circuits respectively each of which may be constituted mainly by a flip-flop for example and which are adapted to store the outputs of the corresponding gates 43, 44, ..... and 48 when such outputs occur respectively and extinguish the stored outputs when a reset signal is imparted to a terminal MR. Numeral 55 represents an OR circuit which is adapted to provide an output when an output is available from any of the memory circuits 49, 50, ..... and 54. Numeral 56 denotes a block instructing circuit which is adapted to provide an output when an output is present at the OR-circuit 55. When an output is provided by the block instruction circuit 56, the APPS associated with each valve of the converter is stopped from operation, so that no output is available therefrom. Numeral 57 represents a pulse generating circuit which may be constituted mainly by a one-shot multivibrator and which is energized by the output of the OR-circuit 55 so as to generate a pulse which lasts for a predetermined period of time with the point of time when the output of the OR circuit occurs as the reference. Numeral 58 indicates an inhibit gate which is adapted to provide an output in the presence of the output of the pulse generating circuit 57 and yet in the absence of the output of the commutation failure detecting circuit 41. Numerals 59, 60, ..... and 64 represent AND gates which are adapted to provide an output when the inhibit circuit 58 and the corresponding memory circuits 54, 49, ..... and 53 provide outputs. The outputs of the respective AND gates are passed to the firing circuits associated with the corresponding valves of the firing circuit 39.

The additional circuit 40 is constructed as above. Here, the following should be noted. That is, a firing input is imparted not only directly to the firing circuits associated with the respective valves from the corresponding APPS's but also through the additional circuit 40. As shown in the drawing, correspondence is established with the phase shifted in such a manner as from the APPS of the valve U$n$ to the firing circuit associated with the valve V$n$. Furthermore, it is only when no output is available from the commutation failure detecting circuit 41 that the respective firing circuits are provided with a firing input through the additional circuit 40.

Figure 4:
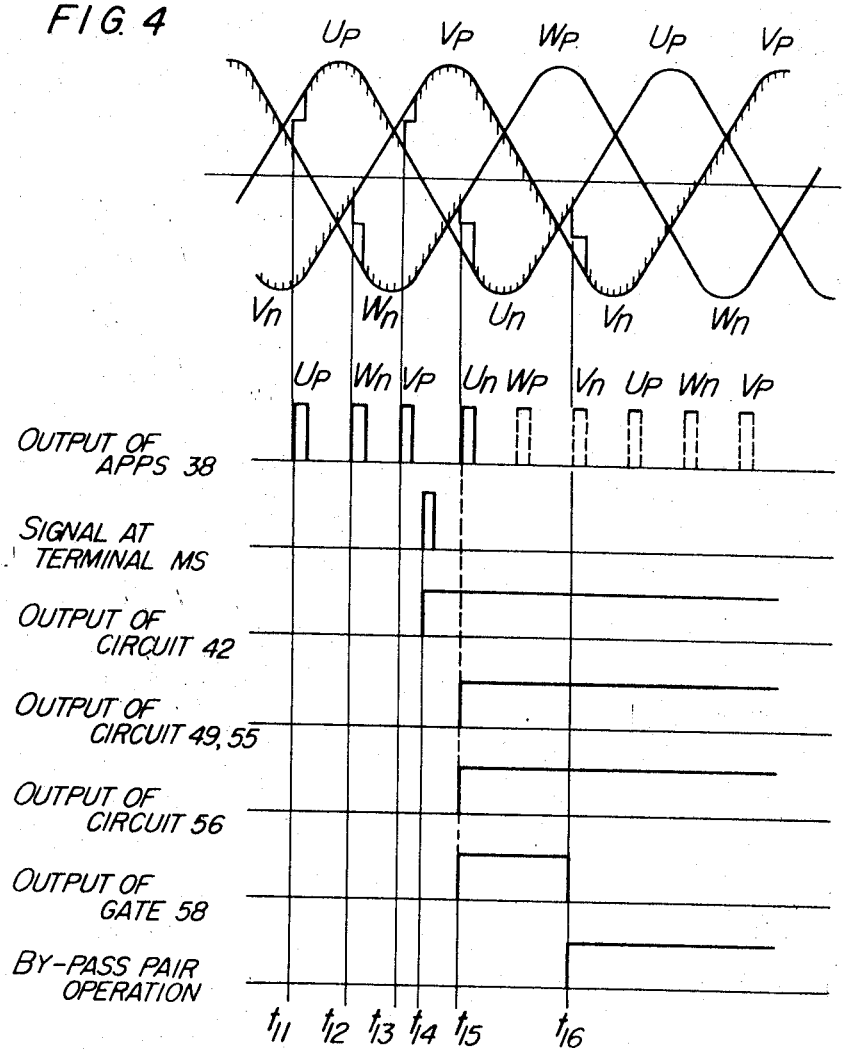
Figure 5:
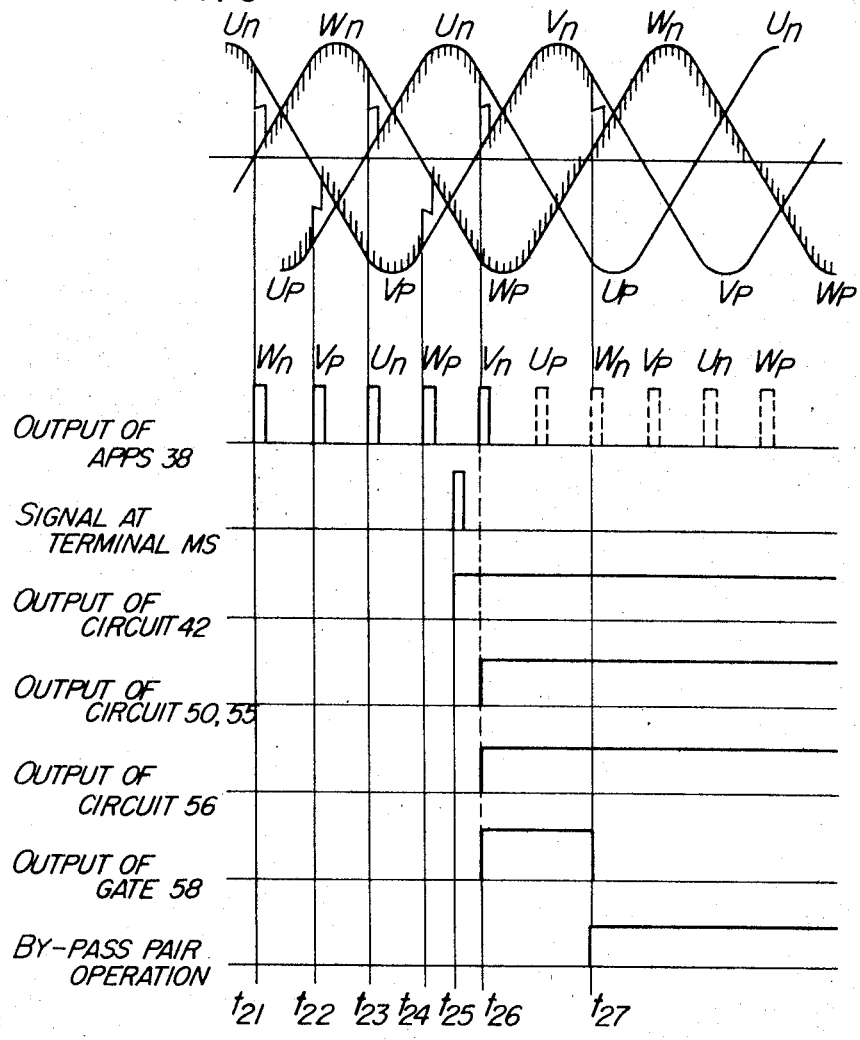

The operation of the circuit shown in FIG. 3 will now be described with reference to the waveforms shown in FIGS. 4, 5 and 6. FIG. 4 illustrates the operation of the bypass pair which is performed by the use of an external bypass pair signal while serving as a rectifier; FIG. 5 the operation of the bypass pair which is performed by an external bypass pair signal while serving as an inverter; and FIG. 6 the operation of the bypass pair which is performed as a result of detection of commutation failure while serving as an inverter. In FIG. 4 each of the valves U$p$, W$n$, V$p$ ... V$n$ is provided with a firing pulse at time $t_{11}$, $t_{12}$, $t_{13}$ ... $t_{16}$, respectively, from circuit APPS 38 and these valves are fired in a predetermined sequence. The valve V$p$ is further supplied with a bypass signal at its terminal NS at time $t_{14}$ immediately after the firing pulse and, as a result, an output is produced by the bypass pair operation instructing circuit 42. When the output is produced in the instructing circuit 42, because the gates 43, 44 ... 48 pass the outputs from the APPS 38, the output of APPS 38 which is supplied to the valve U$n$, on which valve a firing pulse is successively applied and the valve V$p$, is stored in the memory circuit 40 at time $t_{15}$. When an output is provided by the memory circuit 49, OR-circuit 55 provides an output and, hence, a gate block signal is provided by the block instruction circuit 56, causing the APPS to produce no output thereafter. These outputs are shown in FIG. 4 by dotted lines. Accordingly, in this condition, valves V$p$ and U$n$ are maintained in a firing state. If an output is produced in the OR-circuit 55, a pulse generating circuit 57 produces a pulse having a predetermined pulse width and this pulse is applied to the AND-gates 59, 60 ... 64, through an inhibit gate 58. Among the memory circuits 49, 50 ... 54, since only the memory circuit 49 as shown in FIG. 4, produces an output, then at time $t_{16}$, only the gate 60 permits application of the output of the pulse generating circuit 57 to the firing circuit. Thus, on the assumption that the firing circuit 58 provides a firing pulse to the valve V$n$ only when the output of the circuit 57 is extinct, then commutation from the valve U$n$ to the valve V$n$ is effected so that the bypass pair consisting of the valves V$p$ and V$n$ is completed.

In this way, in accordance with the present invention, the gate is blocked in synchronism with a gate pulse by the fact that the bypass pair is instructed and, at the same time, the bypass pair is completed by imparting a firing pulse only to the next valve on the same polarity side as the valve to which the said gate pulse is applied. This can be achieved by specially designing either the pulse generating circuit 57 or firing circuit.

FIG. 5 shows the condition where the bypass pair is instructed immediately after a firing pulse has been imparted to the valve W$p$ of the converter during the operation of the latter and which is similar to that shown in FIG. 4 except that an output is provided by the memory circuit 50 since gate-block is caused in synchronism with the gate pulse applied to the valve V$n$. A bypass pair is established by the valves W$p$ and W$n$.

In other words, at each time $t_{21}$, $t_{22}$ ... $t_{24}$, each of valves W$n$, V$p$ ... W$p$ is provided with a firing pulse and commutation occurs, respectively, from U$n$ to W$n$, U$p$ to V$p$, ... V$p$ to W$p$, for example. At time $t_{25}$, when a bypass pair is instructed by the signal MS, the APPS produces an output V$n$ at time $t_{26}$ and at the same time, the APPS is locked by the circuit 56. Since the production of the output V$n$ is stored in the memory circuit 50, a firing pulse is applied to the valve W$n$ when the circuit 58 provides no output at time $t_{27}$.

FIG. 6 shows the condition where commutation failure of the converter, as the latter is operated as an inverter, has been detected, wherein there is shown, by way of example, a failure which has occurred in the commutation from the valve V$p$ to the valve Wp. As will be seen from the drawing, it is possible to complete a bypass pair by the use of the valve Vp which has failed in commutation, by firing only the valve Vn that is provided with an gate pulse immediately after commutation failure has been detected and, thereupon, effecting gate-block, since failure has been caused in the commutation from the valve Vp to Wp. Thus, when commutation failure is detected as described above the output of the pulse generating circuit is blocked by the gate 58. That is, the additional circuit 40 is so constructed as to possess only the function of effecting a gate-block.

At times $t_{31}$, $t_{32}$ ... $t_{35}$, each of the valves Vn, Up, ... Un is provided with a firing pulse and commutation occurs, respectively, from Un to Vn, Wp to Vp ... Wn to Un, for example. At time $t_{36}$, when a firing pulse has been applied to the valve Wp, which is to be commutated, and if the commutation of valve Vp to valve Wp fails, this commutation failure is detected at time $t_{37}$ and an output is produced in the detection circuit 41. Consequently, the instruction circuit 42 provides an output and at the same time, when the pulse Vn is produced at time $t_{38}$, the APPS is locked. The valve Vn is fired by a pulse Vn and a bypass pair is established by the valves Vp and Vn. In this case, since the output of the pulse generating circuit 57 is not utilized, the outputs of the memory circuits 49, 50, ... 54, which store on which valves the outputs of the APPS were applied when a commutation failure occurred, have nothing to do with the operation.

Since commutation failure can be self-restored, it is also possible that the design may be made so that a bypass pair is established not upon detection of a single commutation failures but only in case that successive commutation failure are detected. In this way, the bypass pair is established. At this time, since the bypass pair current exceeds the overload limit of the valves, it is not permissible to flow the DC line current through the bypass pair for a long time. Accordingly, it is required that the bypass pair current be transferred to the bypass switch subsequent to the establishment of the bypass pair.

In this case, there is such a tendency that unnecessary confusion may be caused if the valves in the converter are used as a bypass pair independently of the AC circuit. More specially, if arc-through occurs in the arms other than the arms used as the bypass pair when the bypass switch is opened, then a DC short-circuit is caused so that there is the possibility that the arms are destroyed and the transformer is burnt-out. A second feature of the present invention is to be able to prevent such unnecessary confusion. This feature of this invention will be described below.

Generally, the operation is performed with the converter switch 24 at the AC side being normally closed. This is also true in an attempt to temporarily stop the converter from operation. Thus, if arc-through is caused in the arm Vp for example due to abnormal operation of the gate control circuit or the like when the arms Wp and Wn are controlled as bypass pair, then a DC short-circuit of the arm Vp—switch 34-arm Wn is established by closing the bypass switch subsequent to the firing of the bypass pair, so that there may occur the possibility that the arms Vp, Wn and transformer 23 are burnt.

That is, when some countermeasure should be taken in an attempt to control the starting and stopping of the equipment and connection and disconnection of the converter with the aid of the bypass pair instead of the bypass valves, such a DC short-circuit as described above tends to be caused, thus leading to serious trouble.

The present invention is further intended to prevent such trouble. That is, in accordance with the present invention, the aforementioned DC short-circuiting is avoided by establishing a proper locking relationship between the bypass switch 34 and the converter switch 24, so that the aforementioned control by the bypass pair can be performed safely and without failure.

One of the causes for the above-described problem is that the converter switch 24 is normally closed. In so far as the control is effected by means of the bypass pair 33 and switch 34 as in the conventional equipment, there is no possibility that the aforementioned DC short-circuiting is caused even if the condition is ready for occurrence of arc-through. Therefore, the switch 24 may remain normally closed, and naturally it is only in such cases as that where the converter is overhauled that this switch is opened.

In accordance with the present invention, in order to avoid the occurrence of DC short-circuiting, the switch 24 is also controlled in opening and closing in relation to the switch 34 as shown in FIG. 7. In the cases (I) and (II) of FIG. 7, DC voltage → 0 indicates that transition to the next step is possible under the condition that "DC voltage = 0" has been detected.

Figure 8:
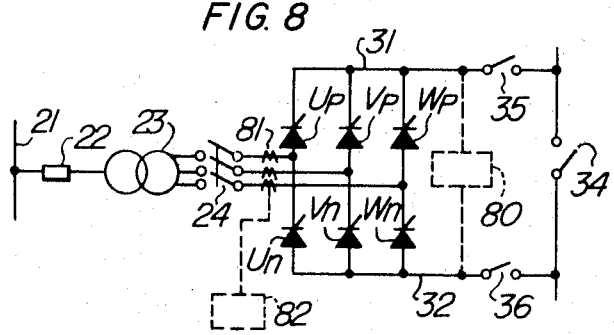
FIG. 8 is a view showing an example of the voltage-current detecting station for effecting the control described above in connection with FIG. 7.

"DC voltage = 0" referred to above means that the DC voltage between the buses 31 and 32 has become lower than a predetermined level, and the voltage does not have to be exactly zero. In order to detect this condition, a voltage detecting means is provided between the buses 31 and 32. The attachment of the condition "DC voltage = 0" means that the fact that the transformer has been switched from the state in which it functions as a bypass pair is detected in accordance with the condition "DC voltage = 0," and this may be backed up with the AC current supplied to the converter being made zero, if necessary. To this end, a current transformer 81 and current detector 82 may additionally be provided thereby to monitor the current. Referring to FIG. 8, there are shown the detecting means described immediately above by dotted lines.

Figure 9:
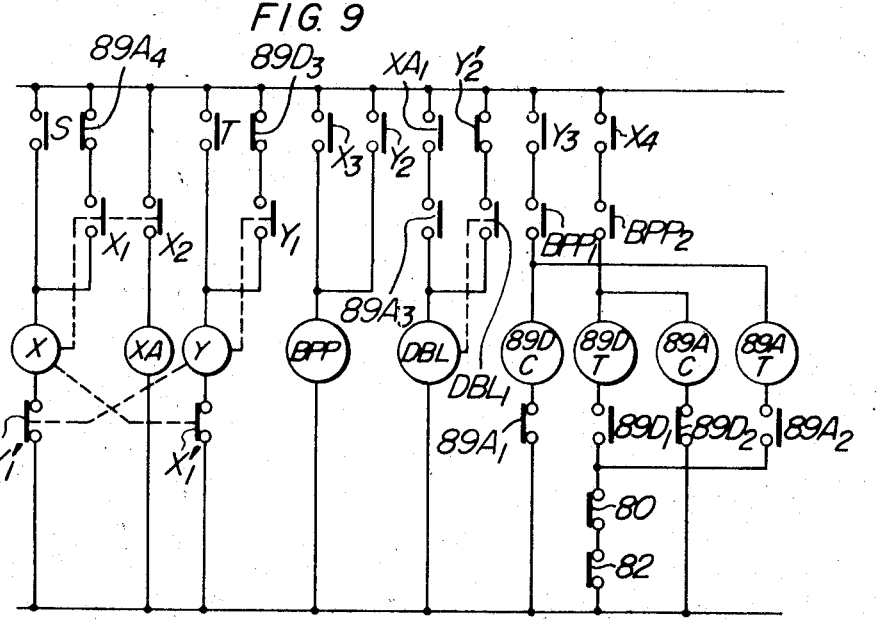
FIG. 9 is a connection diagram showing an example of the control circuit for effecting the control described above in connection with FIG. 7.

FIG. 9 shows an example of the control circuit for working the present invention, wherein S represents a contact for instruction of the case (I) in FIG. 7, T a contact for instructing the case (II), and X and Y auxiliary relays respectively, each of which is adapted to be energized and operated when the contacts S and T are made when the other switch is in the nonoperable state. XA is an auxiliary relay for timing return which is adapted to be energized when the relay X is operated. BPP is an auxiliary relay, the converter being controlled as bypass pair when this relay is operated. DBL is an auxiliary relay, the converter being controlled so as to essentially function as a converter. 89D and 89A are contacts for indicating the states of the switches 34 and 24, respectively, 89DC, 89DT and 89AC, 89AT are coils for turning on and off the switches 34 and 24, respectively. Numerals 80 and 82 represent contacts responsive to the outputs of the voltage and current detecting means indicated at 80 and 82 in FIG. 8, respectively.

$X_1$, $X_2$, ....., $X_1'$, $Y_1$, $Y_2$, ....., $Y'$, ....., and $BPP_1$, ....., $DBL_1$ are contacts associated with the relays X, Y, BPP and DBL respectively, the contacts indicated by the symbols with dash being normally closed and the remaining ones being normally open.

Figure 10:
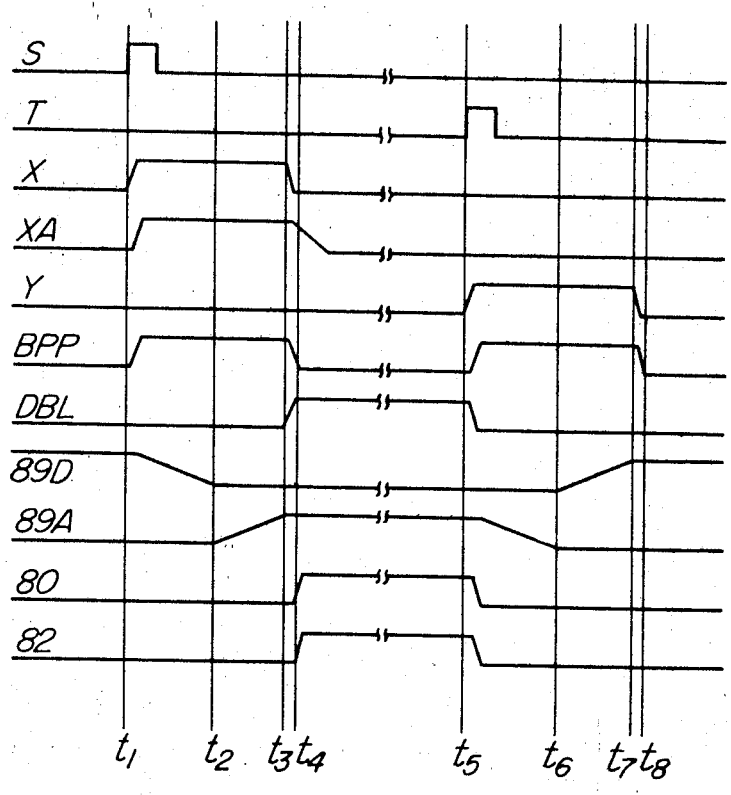
FIG. 10 is a waveform useful for explaining the operation of the circuit shown in FIG. 9.

Referring to FIG. 10, there are shown various waveforms occurring at the portions of the control circuit during its operation. When a start has been instructed, (or when the contact S is closed) at time $t_1$, referring to FIG. 9, the relay X operates and consequently, the relay X is self-held through the contacts 89A4 and $X_1$, and at the same time, causes the relay $X_A$ to operate through the contact $X_2$ so as to cause the relay BPP to operate through a contact $X_3$ and thus, a bypass pair is instructed to the converter. In other words, the operation of the relay BPP corresponds to the production of an output in the bypass pair operation instruction circuit 42. Furthermore, since a series circuit of the contacts $X_4$ and $BPP_2$ is completed, due to the operation of the relays X and BPP, the relay 89DT is energized, (at this time the switch 34 is closed and, hence, the contact 89D1 is in its closed condition), therefore, at time $t_2$ the switch 34 is opened. When the switch 34 is opened, since the contact 89D2 is closed, the relay 89AC is energized, whereby the switch 24 is closed at time $t_3$. Due to the closing of the switch 24, the contact $XA_1$ of the relay XA, which as been in operation, and the contact 89A3 are connected in series and hence, the relay DBL operates and also releases the self-holding operation of the relay X, so as to release the bypass pair at time $t_4$ and the converter shifts into a normal operation.

On the other hand, when a stop has been instructed at time $t_5$, and a contact T is closed, then a relay Y is energized and it is self-held through the contacts $Y_1$ and 89D3. The closing of the relay $Y_2$ causes relay BPP to operate and a bypass pair is instructed to the converter. Furthermore, since a series circuit of the contacts $Y_3$ and $BPP_1$ is completed, the relay 89AT is energized, (at this time the switch 24 is closed and the contact 89A2 is in its closed state), whereby the switch 24 is opened at time $t_6$. Since the opening of the switch 24 causes contact 89A1 to be closed, a relay 89DC is energized and, thus, the switch 34 is closed at time $t_7$. When the switch 34 is closed, the contact 89D3 is opened and thus, the relay Y is released and the BPP is also released.

The switch 34 can be closed only when the switch 24 is opened and, therefore, problems which might be caused by forming a bypass pair are prevented. In the shown example, there may occur between $t_3$ and $t_4$ a short-time chance that the instructions for deblocking the bypass pair and converter are simultaneously given, but it is readily possible to cope with this by designing the gate circuit of the converter so that preference is given to the bypass pair.

As will be appreciated from the foregoing, in accordance with the present invention, a suitable interlock is provided between the switches 24 and 34, whereby any possibility of occurrence of DC short-circuiting can be eliminated even if arc-through is caused.

Although the present invention has been illustrated and described with respect to specific embodiments, it is to be understood that the present invention is by no means limited to such specific embodiments. The present invention can equally be applied to a converter used as DC interconnecting apparatus. Furthermore, it is of course understood that the valves constituting each arm may be series and parallel connections of a plurality of thyristor cells.

Still furthermore, the pulse generating circuit 57 may be so designed as to generate a pulse corresponding to a predetermined gate pulse after the lapse of a predetermined period of time. Needless to say, it is also possible that the block circuit 56 may be so designed that only one of the outputs of APPS's which corresponds to the output of the pulse generating circuit 57 may be used, without providing the pulse generating circuit 57.

What is claimed is:

1. In a converter constructed in the form of a multiphase graetz connection of silicon controlled rectifiers including a converter switch for connecting said converter to an AC bus, and a bypass switch, the improvement comprising means for bypassing said converter exclusive of a bypass valve, wherein a bypass pair of said silicon controlled rectifiers is established instead of bypass valves including a bypass control system for simultaneously firing two arms of said graetz connection in series in one phase of said converter wherein said system has a means for closing said bypass switch only when said converter switch is open.

2. In a converter constructed in the form of a multi-phase gate connection in which respective arms are constituted by semiconductor controlled rectifiers serving as valve elements, a bypass control system comprising automatic pulse phase shifter circuits for controlling the delay angle of the valves in the respective arms, a firing circuit for firing each valve by the use of the output of said phase shifter circuits, a bypass instruction circuit for providing an instruction to establish a bypass pair by simultaneously firing two arms in series in one phase, a memory circuit for memorizing that one of said phase shifter circuits which first provides an output when an output is provided by said instruction circuit, a block instruction circuit for interrupting the operation of said phase-shifter circuit when an output is provided by said memory circuit, and a pulse generating circuit for generating a firing pulse to fire the valves at a predetermined time after an output is provided by said memory circuit, and means responsive to the generation of an instruction for said bypass pair irrespective of trouble in the converter, for imparting the output of said pulse generating circuit to said firing circuit associated with a given arm in relation to the phase shifter circuit memorized by said memory circuit, and means responsive to the generation of an instruction based upon trouble in the converter, for preventing the output of said pulse generating circuit from being imparted to said firing circuit.

3. A control system in accordance with claim 2, wherein said memory circuit includes a plurality of storage flip-flops respectively associated with each valve, each flip-flop being connected to the output of an associated AND gate, a common input of which is connected to the output of said bypass instruction circuit and another input of which is connected to the output of each respective automatic pulse phase shifter circuit.

4. A control system in accordance with claim 3, further including a plurality of AND gates respectively associated with each of said firing circuits, a common input of which is connected to said pulse generating circuit, and a respective input of which is connected to said flip-flops.

5. A control system in accordance with claim 4, further including an OR gate connected to each of the outputs of said flip-flops and whose output is connected to said block instructions circuit and wherein said pulse generating circuit includes a monostable multivibrator responsive to the output of said OR gate and an INHIBIT-AND gate connected to the output of said monostable multivibrator, the output of said INHIBIT-AND gate being connected to each of said AND gates associated with said firing circuits.

6. A control system in accordance with claim 5, wherein said preventing means includes a communication failure detector connected to the INHIBIT input of said INHIBIT-AND gate and to said bypass instruction circuit.

7. A control system in accordance with claim 2, wherein said control system further includes a current detector associated with each respective phase line of said multiphase connection and further including a control circuit, said control circuit including a first relay responsive to a converter starting signal for closing a pair of contacts associated across the voltage lines of said converter.

8. A control system in accordance with claim 7, further including a second relay, connected in series with one of the contacts of said first relay and a self-holding contact associated therewith for holding said relay operation in response to the closure of a stopping switch.

9. A control system in accordance with claim 8, further including a first set of relays connected in parallel across said voltage lines, a first auxiliary relay and a second auxiliary relay, said first relay effecting the operation of said converter in the bypass pair mode, the operation of said second auxiliary relay being responsive to the closure of the contacts of said first relay.

* * * * *

UNITED STATES PATENT OFFICE
CERTIFICATE OF CORRECTION

Patent No. 3,636,431        Dated January 18, 1972

Inventor(s) Takehiko Machida, Yukio Yoshida, Noriyoshi Fujii and Kenjiro Yokoyama It is certified that error appears in the above-identified patent and that said Letters Patent are hereby corrected as shown below:

Column 1, line 9, Zaidan Hojin Denryo Chuo should read

-- Zaidan Hojin Denryoku Chuo --

Signed and sealed this 11th day of July 1972.

(SEAL)
Attest:

EDWARD M. FLETCHER, JR.            ROBERT GOTTSCHALK
Attesting Officer                   Commissioner of Patents